(12) United States Patent
Musto et al.

(10) Patent No.: US 6,802,718 B2
(45) Date of Patent: Oct. 12, 2004

(54) FUEL SPILL FIREFIGHTER TRAINER

(75) Inventors: Dominick J. Musto, Middlesex, NJ (US); Steven J. Williamson, Wayne, NJ (US)

(73) Assignee: Kidde Fire Trainers Inc., Fair Lawn, NJ (US)

( * ) Notice: Subject to any disclaimer, the term of this patent is extended or adjusted under 35 U.S.C. 154(b) by 161 days.

(21) Appl. No.: 10/126,234

(22) Filed: Apr. 19, 2002

(65) Prior Publication Data

US 2003/0198922 A1 Oct. 23, 2003

(51) Int. Cl.[7] .............................. G09B 19/00; G09B 9/00
(52) U.S. Cl. ..................................... 434/226; 434/219
(58) Field of Search .............................. 434/219, 226, 434/365; 431/2, 125, 202; 392/394, 403; 454/351; 340/584, 622, 635; 169/5, 68

(56) References Cited

U.S. PATENT DOCUMENTS

| | | | | |
|---|---|---|---|---|
| 3,644,073 A | * | 2/1972 | Goldsmith ..................... 431/2 |
| 4,303,396 A | * | 12/1981 | Swiatosz ..................... 434/226 |
| 4,861,270 A | * | 8/1989 | Ernst et al. .................. 434/226 |
| 4,983,124 A | * | 1/1991 | Ernst et al. .................. 434/226 |
| 5,052,933 A | * | 10/1991 | Rogers et al. ............... 434/226 |
| 5,055,050 A | * | 10/1991 | Rogers et al. ............... 434/226 |
| 5,181,851 A | * | 1/1993 | Layton et al. ............... 434/226 |
| H001134 H | * | 2/1993 | Meadows et al. ........... 434/226 |
| 5,226,818 A | * | 7/1993 | Feiock et al. ................ 434/226 |
| 5,316,484 A | * | 5/1994 | Layton et al. ............... 434/226 |
| 5,367,603 A | * | 11/1994 | Wenrich et al. .............. 392/394 |
| 5,374,191 A | * | 12/1994 | Herman et al. .............. 434/226 |
| 5,411,397 A | * | 5/1995 | Rogers et al. ............... 434/226 |
| 5,447,437 A | * | 9/1995 | Joynt et al. .................. 434/226 |
| 5,518,403 A | * | 5/1996 | Luftig et al. ................ 434/226 |
| 5,700,141 A | * | 12/1997 | Miller et al. ................ 431/125 |
| 5,888,072 A | * | 3/1999 | Musto et al. ................ 434/226 |
| 5,927,990 A | * | 7/1999 | Welch et al. ................ 434/226 |
| 6,184,793 B1 | * | 2/2001 | Webb ......................... 340/622 |
| 2003/0121672 A1 | * | 7/2003 | Spaniol et al. .................. 169/5 |

\* cited by examiner

Primary Examiner—Joe H. Cheng
(74) Attorney, Agent, or Firm—Merchant & Gould, P.C.

(57) ABSTRACT

An enhanced deck for generating live fire simulations of fuel spill and chemical fires and the like, and includes a pit for receiving a volume of fluid, such as water, within which is mounted a fuel burner array. Gaseous or liquid fuel is delivered to the burner assembly under pressure, resulting in the expulsion of fuel into the liquid, where the fuel transforms into vapor and rises to the surface of the pit. A support surface structure is provided at the top of the pit flush to the ground level to permit vehicle movement. The fuel vapor is ignited at the support surface to generate a training fire.

31 Claims, 5 Drawing Sheets

FUEL SPILL FIREFIGHTER TRAINER

BACKGROUND OF THE INVENTION

1. Field of the Invention

The subject invention relates generally to fire simulation systems utilizing propane or similar gases for training municipal, military, and other firefighter trainees as to the preferred procedures for suppressing and ultimately extinguishing fires. Particularly, the invention relates to a firefighter training system which is operable to produce a realistic live fire simulation of fuel spill, chemical and similar types of fires.

2. Description of the Prior Art

Firefighter training practices have provided for the combustion of flammable materials, such as wood, straw, and other organic and inorganic materials, which are to be extinguished by the trainee upon the application thereon of sufficient quantities of an appropriate extinguishing agent. The extinguishing agent that is most commonly utilized is water, due principally to its availability, cost and widespread usage as a fire extinguishing material. These training practices can result in relatively high injury rate, adverse environmental impact, and limited training effectiveness and trainee throughput that is associated with such practices. For example, the National Fire Protection Association (NFPA) reports that in the United States alone, nearly 6,000 training-related injuries were sustained by firefighters in 1988. Nevertheless, live fire training is a crucial and necessary component of firefighter training, for it most closely represents the overall environment a firefighter is likely to encounter during a genuine fire emergency. These facts have lead to the introduction of various training devices utilizing propane and similar fuels which can be easily controlled. During the training smoke, heat and sound effects can be introduced to increase realism.

These devices utilizing propane and natural gas-operable burners located within dedicated "burn rooms." Various methods have been utilized for having the fire respond to the particular extinguishment agent being utilized by the firefighters. Typical of this arrangement is that disclosed in U.S. Pat. No. 4,861,270 issued Aug. 29, 1989 and U.S. Pat. No. 4,983,124 issued Jan. 8, 1991, both to Ernst et al.

These type of firefighter trainers are not readily adoptable to fuel spills. Certain patents have disclosed systems for training fire fighters for fuel spills such as U.S. Pat. No. 5.052,933 issued Oct. 1, 1991, U.S. Pat No. 5,055,050 issued Oct. 8, 1991 and U.S. Pat. No. 5,411,397 issued May 2, 1995, all to Rogers et al. and U.S. Pat. No. 5,374,191 issued Dec. 20, 1994 to Herman et al. which also deals with decking and fuel spills showing the use of a deck on the surface of the burn area. These trainers do not allow heavy vehicles on the burn area. U.S. Pat. No. 5,367,603 issued Nov. 22, 1994 to Wenrich et al. shows a pilot light assembly which can be utilized with a fuel spill trainer.

The foregoing and other deficiencies are overcome by the new methods and apparatus of the present invention, the details of which are set forth in the following text and accompanying drawings.

SUMMARY OF THE INVENTION

In accordance with the invention, a novel design firefighter trainer is provided for simulating fuel or chemical spills on the surface of the ground. The design allows heavy vehicles to move over the burn area with equipment and firefighters or extinguishing water hoses or similar equipment.

The surface of the burn area must be at or near ground level to represent such a spill. The top surface of the burn area can not present any obstruction or hindrance to vehicles entry over the area. The burn surface must be able to withstand any thermal stress created by the cycle of rapid heating and cooling. It is essential that the flames generated by burning propane or similar gas must have the appearance of an aviation fuel spill or the like including the wet look of an actual burning fuel spill.

The structure of the invention utilizes a steel, reenforced decking in a shallow pit suitable for holding liquid. The pit can be formed of concrete or similar construction materials. The preferred liquid is water so the invention will be described as using water. The decking has a bearing surface preferable constructed of straight bearing bars securely connected with S-shaped reticuline bars. The top surface of the straight and recticuline bars are at the same height and form the surface of the burn area. The straight bars are supported on the pit surface. The straight bars are approximately 1" taller than the reticuline bars and form channel spacers between the straight bars under the reticuline bar. There are also channels for the fuel piping in the top of the concrete pit surface. The decking is orientated with its channel spaces perpendicular to the fuel piping channels in the pit surface. As a result, the decking is supported above the fuel piping.

The piping has spaced discharged ports which expel the fuel into the water which then flows to the surface of the water in the pit. The fuel is ignited on the surface of the water to simulate a gasoline or diesel fuel spill. The orientation of the channels in the pit and raised channels within the deck permits the release of the fuel to be evenly dispersed throughout the burn area. The fuel is preferably propane liquid or gas.

Although the pit is illustrated as square it can be rectangular or circular. Although the illustration is of one element, it can be expanded to cover larger areas in a multi-zone arrangement.

The deck is preferably a truss-style design. The reticulated riveted bar configuration in conjunction with the bearing bars gives the configuration a high strength and stiffness-to-weight ratio necessary for heavy-duty utilization. The configuration has excellent lateral stability since the reticulated bars act as cantilever beams in distributing concentrated loads laterally to the adjacent bearing bars. Allowing the reticulated bars run parallel with the main bearing bars, the reticulated bars also provide a supplementary bending resistance.

The firefighter trainer can be controlled manually which is usually done in smaller trainers or by the utilization of computer which allows the operator to control the training session by having complete control over the flame spread, temperature and safety devices or auxiliary equipment as hereinafter detailed.

DETAILED DESCRIPTION OF THE PREFERRED EMBODIMENT

Figure 1:
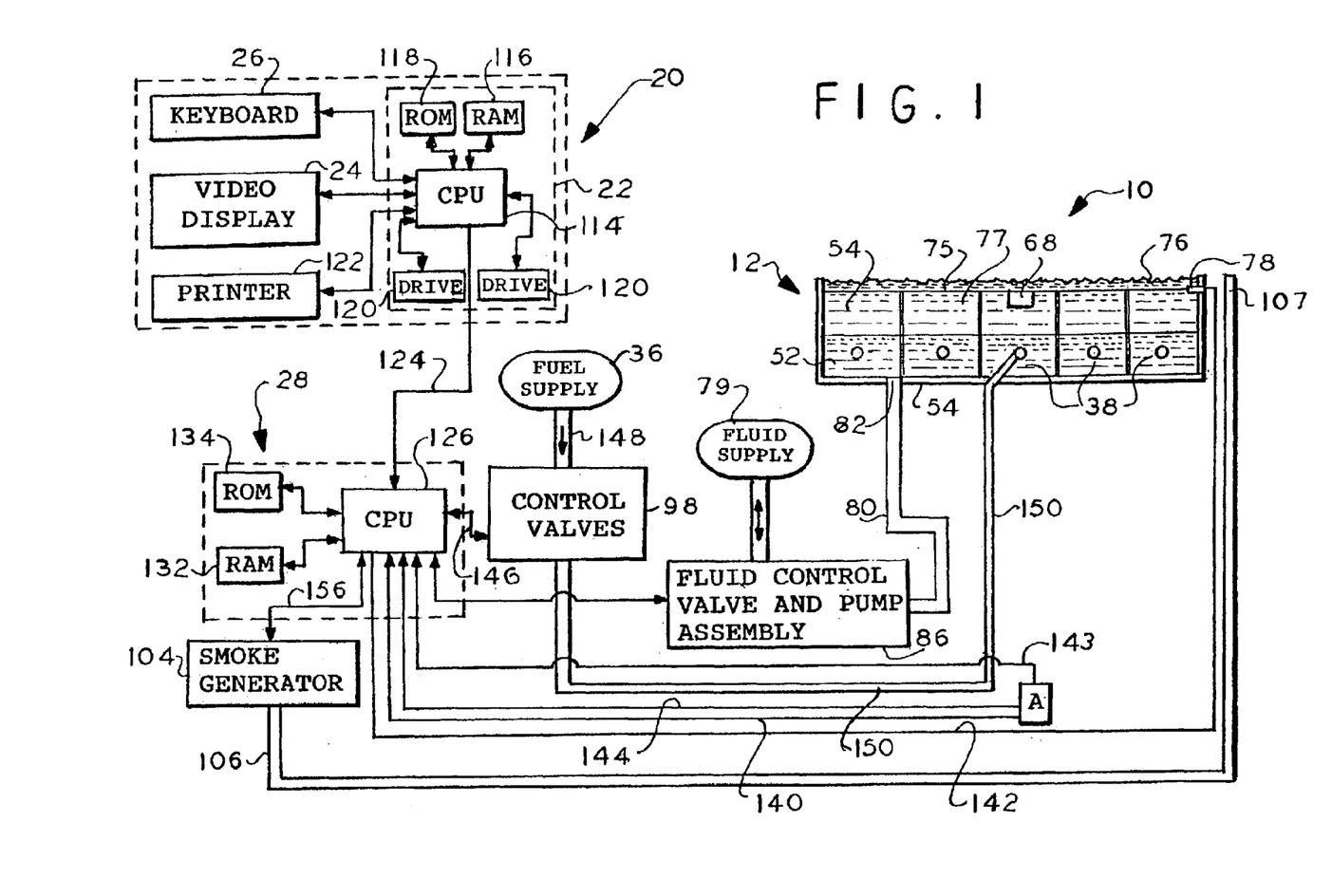
FIG. 1 is a schematic view of the invention.

With reference to the drawings, wherein like reference characters represent corresponding parts throughout the various views, and with particular reference to FIG. 1, there is depicted a firefighter trainer for gasoline or diesel oil or aviation gasoline or chemical spill in accordance with the principles of the invention. The trainer is designated generally by reference character 10. The trainer is constructed in a pit generally indicated at 12 for retaining water 76 or other liquid, and maintaining the upper surface 75 of a reinforced deck generally indicated at 50 of the trainer at ground level. The reinforced deck 77 within the pit 12 and fuel outlets 38 ore ordinated with the deck to allow fuel to move out of the outlets to the surface of the water where it is ignited to simulate a fuel spill on the ground. An ignition systems 68 is provided for igniting the fuel on the surface of the liquid such as water.

As shown in the drawing, a master processing unit generally indicated at 20 can be provided if desired which comprises a central unit which includes a central processing unit (CPU) 114 and at least one disk drive 120, a display screen 24 such as a CRT, and a suitable data input device 26 such as a keyboard and/or manual input device (e.g., "mouse") not shown. The master processing unit 20 can be positioned remote from the fire area and is operable to communicate in a "master/slave" relationship in the manner described below, as indicated by control line 124, with a local automated processing unit generally indicated at 126 that is associated where the simulation is to be conducted. The local processing unit 28 provides control signal inputs to the various control devices such as fuel inlet valves, smoke generators and emergency fire suppression and ventilation apparatus described below. The remote processor has various electrical lines connected to the various components to give current data to the processor. These lines are indicated as 140, 143, 144, and either connected to the sensing device shown or go to box A which is the various connections not shown.

Data regarding the operation and/or performance of the apparatus controlled by the local processing unit 126 is conveyed to the master processing unit 20 along the control line 124. Additionally, data sensed by various sensors, such as temperature sensor thermocouple 78 is communicated to the local processing unit 126 along a sensor data line 142 for processing after which the processed sensor data can be communicated to the master processor 20 for display to the operator. Fuel such as propane (gaseous or liquid) or natural gas is housed on-site within a suitable storage tank 36 or is obtained from a local commercial supply line. The fuel is passed through conduit 148 to control valves 98 and then through conduit 150 to piping in the pit which contain fuel outlet ports 38.

Suitable fire extinguishing agents to be used by the firefighters include water, simulated foam, simulated PKP powder and $CO_2$ fog for application to a fire in a manner well known in the art. The fuel outlet ports 38 can be optionally controlled to simulate various types and degrees of fire by utilizing a program in the computer. Typical uses would be to simulate the spread of the fire from one area to another area.

If desired, the applied extinguishing agent can be collected for conveyance to, for example, one or more detectors for analysis as to volume and/or composition such as disclosed in U.S. Pat. No. 4,861,270, which disclosure is incorporated herein by reference. Results of the analysis can be output to a computer printer for generation of a permanent record, or may otherwise be reported to the trainees and supervisor for critiquing as to, for example, the quantity and/or appropriateness of the extinguishing agent applied to the fire.

In a big fuel spill simulation, the fire is so intense and the wind conditions such that simulated smoke is not used. However, in some instances, it may be desirable to obscure further the trainees' vision by the use of a simulated smoke generating apparatus, such as that described in U.S. Pat. No. 5,374,191. In FIG. 1, a smoke generator 104 sends smoke through conduit 106 to discharge in the fire zone through port 107. Although the drawing indicates only one outlet, multiple outlets can be utilized to produce a smoke similar to that obtained in a real fire.

Details of the enhanced deck for firefighter trainers are illustrated in FIGS. 2, 3, 4 and 5. The enhanced deck is designated generally by reference character 50. The design allows heavy vehicles to move over the burn area. The surface of the burn area must be at or near ground level to represent such a spill. The top surface of the burn area can not present any obstruction or hindrance to vehicles' entry over the area. The burn surface must be able to withstand any thermal stress created by the cycle of rapid heating and cooling. It is essential that the flames generated by burning propane or similar gas must have the appearance of an aviation fuel spill, including the wet look of an actual burning fuel spill.

Figure 2:
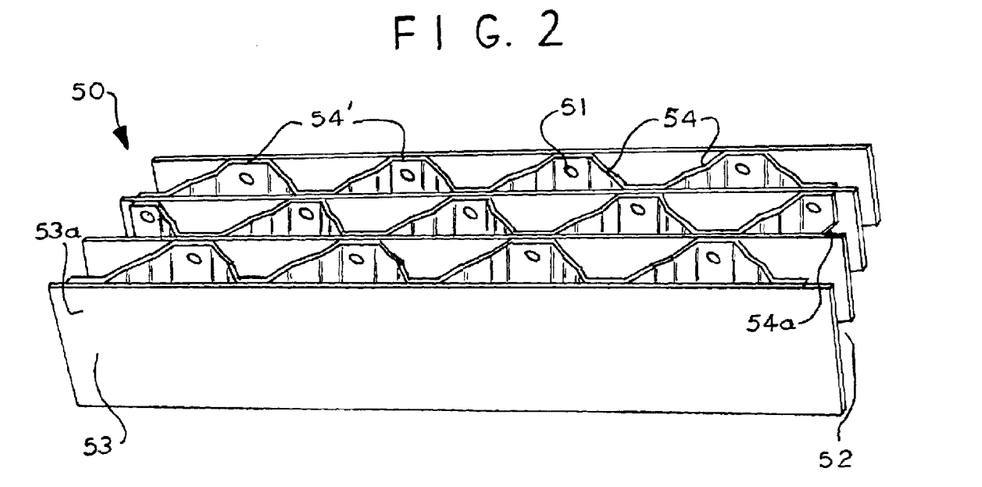
FIG. 2 is a perspective side view of a decking section depicted in FIG. 1.
Figure 3:
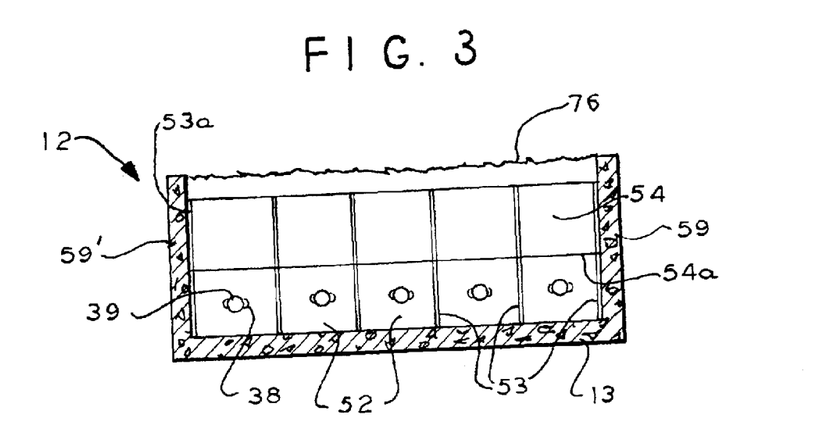
FIG. 3 is a side view of a pit with a section of decking in place.
Figure 4:
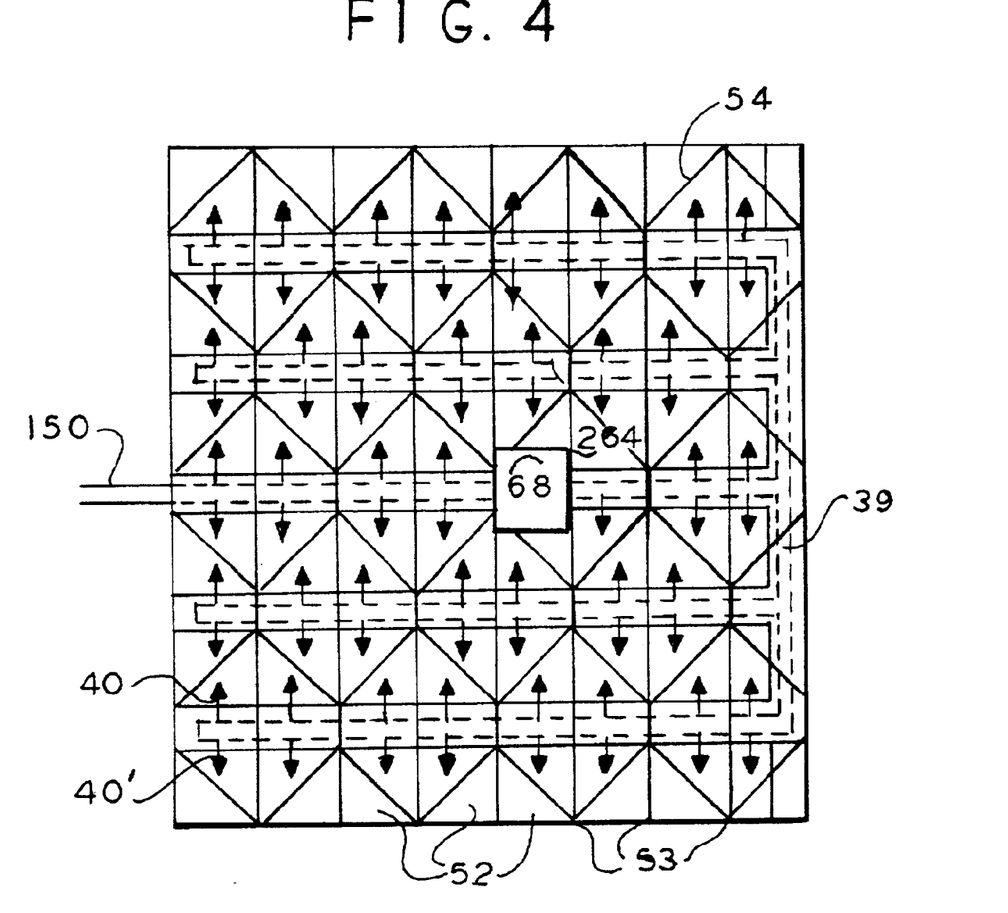
FIG. 4 is a top view of the decking section illustrating the fuel piping.

The structure of the invention utilizes a steel reenforced decking lying in a shallow pit 12 suitable for holding water. The pit is preferably formed of concrete 13. The decking has narrow, vertical channels 53 running between S-shaped reticuline bars 54. A fuel supply piping 39 is laid in the pit channels in a rectangular, checked pattern. The orientation of the channels in the pit and raised channels within the deck permits the release of propane liquid or vapor to be evenly dispersed throughout the burn area.

The vertical supporting bars 53 are preferably ⅜ inches thick, approximately 2.5 inches high with spacing of 2.6875 inches center to center. These bars rest on the bottom of the burn area pit 12. As indicated, the upper bearing surface of the deck has S-shaped reticuline bars 54, 54' which are preferably 3/16 inch thick and approximately 1.5 inches high between the parallel support bars 53 and welded or riveted 51 in place to the upper portion 53a of the support bars 53. A raised 1.0 inch raised channel space 52 is created bounded between the vertical bearing bars 53 and the bottom 54a of the reticuline bars 54. The raised channel permit the propane to be dispersed along the length of the deck surface.

The deck rests in a concrete constructed burn area pit 12. The pit depth is approximately 3 inches below the perimeter grade for a 2.5 inch high decking. The spacing of the channels in the pit is approximately 15 inches but this can very depending on the structure selected. Although the gas discharge area is illustrated as square it can be rectangular or circular. Although the illustration is of one deck element 77, it can be expanded to a series of decks to cover larger areas in a multi-zone arrangement.

As indicated, the deck 50 is preferably a trust style design. The reticulated riveted bar configuration in conjunction with the bearing bar gives the configuration a high strength and stiffness-to-weight ratio necessary for heavy duty utilization. The configuration has excellent lateral stability since the reticulated bars act as cantilever beams in distributing concentrated loads laterally to the adjacent bearing bars. Allowing the reticulated bars to run parallel with the main bearing bars, the reticulated bars also provide a supplementary bending resistance.

The pit generally indicated at 12 is structured for receiving and retaining a quantity of a cooling fluid such as water 76. The pit 12 can be in the form of a tub, pan, excavated pit or similar structure that is adapted for receiving and retaining a fluid. In the illustrated embodiment, the pit 12 is in the form of a rectangular tub that is formed from concrete 13, steel or any other temperature resistant material. The pit has side walls 59, 59'.

Figure 5:
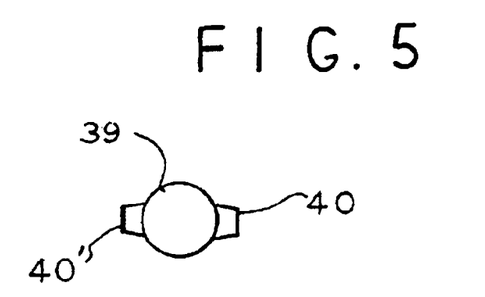
FIG. 5 is a side view of a burner head.
Figure 6:
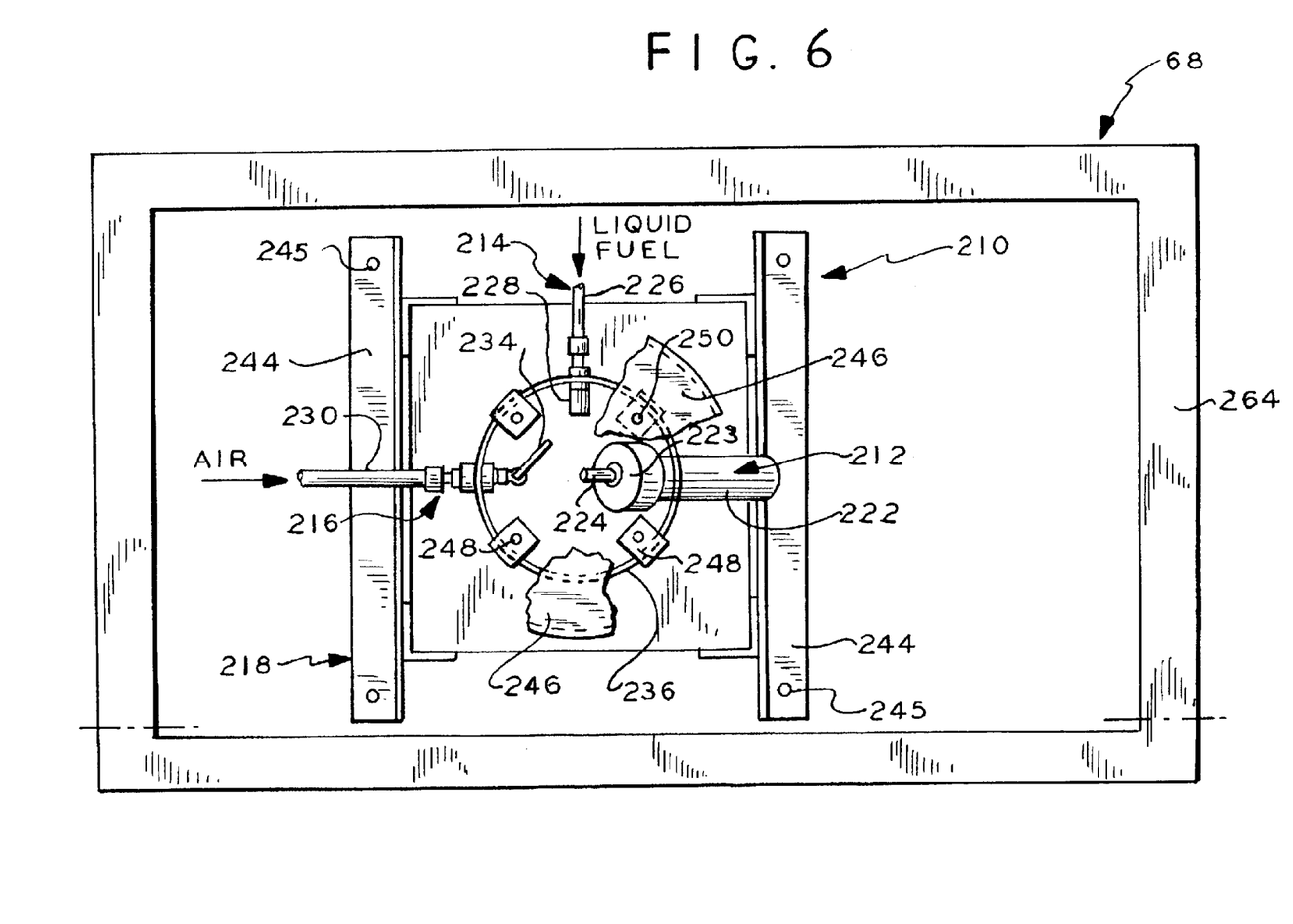
FIG. 6 is an illustration of a liquid pilot assembly.

The preferred layout for the fuel piping 39 and discharge nozzles 40 and 40' as illustrated in FIGS. 5 and 6. The pipes 39 are formed in a rectangular web beneath the S-shaped reticuline bars 54 in the narrow channels 52 running along its bottom. The orientation of the channels in the pit and raised channels within the deck permits the release of propane liquid or vapor to be evenly dispersed throughout the burn area. The fuel supply includes a conduit 150. Discharged ports 40, 40' are located along the conduit so that the gas being discharged under pressure from the ports flows upward in an unobstructed path to the surface of the water. The discharge ports 40, 40' can be arranged in one or more horizontal rows along the side of the fuel conduit. In the illustrated embodiment, the discharge ports 40, 40' are in pairs on opposite sides of the conduit 39.

Gaseous or liquid fuel that is expelled from the discharge ports 40, 40' moves upward as it passes through the water 76 contained within the pit 12 in a known manner and, due to its specific gravity, rises to the surface of the water, where it is first ignited by one or more flames or sparks emitted by an ignitor assembly generally indicated at 68 that will be described in detail below.

The temperature of the support surface, and optionally that of the pit water can be sensed by one or more appropriate sensors 78, which are preferably in the form of thermocouples. The thermocouple or other suitable temperature sensor 78 is connected to one or more portions of the decking and is operable to generate a signal that is representative of the sensed support surface temperature. Use of a thermocouple for the sensor allows for the detection of agent application.

The fluid such as water, can be supplied from a local source which has enough pressure. As an alternative, the water can be stored in a supply tank 79 and is supplied to the pit 12 through fluid conduit 80 that terminates at an outlet 82 formed in the pit 12. The flow of fluid from the supply tank 79 to the pit 12 passes through outlet 82 is controlled by a control valve and pump assembly 86, preferably in accordance with control input in the manner described below. The control valve and pump assembly is preferably operable to effect fluid delivery and removal (as will occur with fluid draining for changeover or system winter storage) from the pit 12 in a manner well known in the art.

As has been discussed previously, fuel vapor that collects at the surface of the water contained by the pit 12 is ignited by a flame or spark emitted by an ignitor. Any type of igniter can be use such as assembly 68 illustrated in FIGS. 6 and 7.

As propane and natural gas are relatively clean burning fuels, realism of the training scenario can be further enhanced through the provision of a visual obscuration medium such as simulated smoke. To that end, a generator 104 of suitable simulated smoke can be provided adjacent to the receptacle to supply simulated smoke for the training scenario. Preferably, the simulated smoke is conveyed from the smoke generator 104 in a conduit 106 to the area of the flames.

A liquid pilot assembly is provided to ignite the fuel. The assembly is in a recess 264 in the deck 77. The assembly includes a spark plug igniter unit, a liquid fuel system, an air distribution system, a housing enclosing the components and a vaporization subassembly disposed within the housing for changing liquid fuel to vapor fuel.

Figure 7:
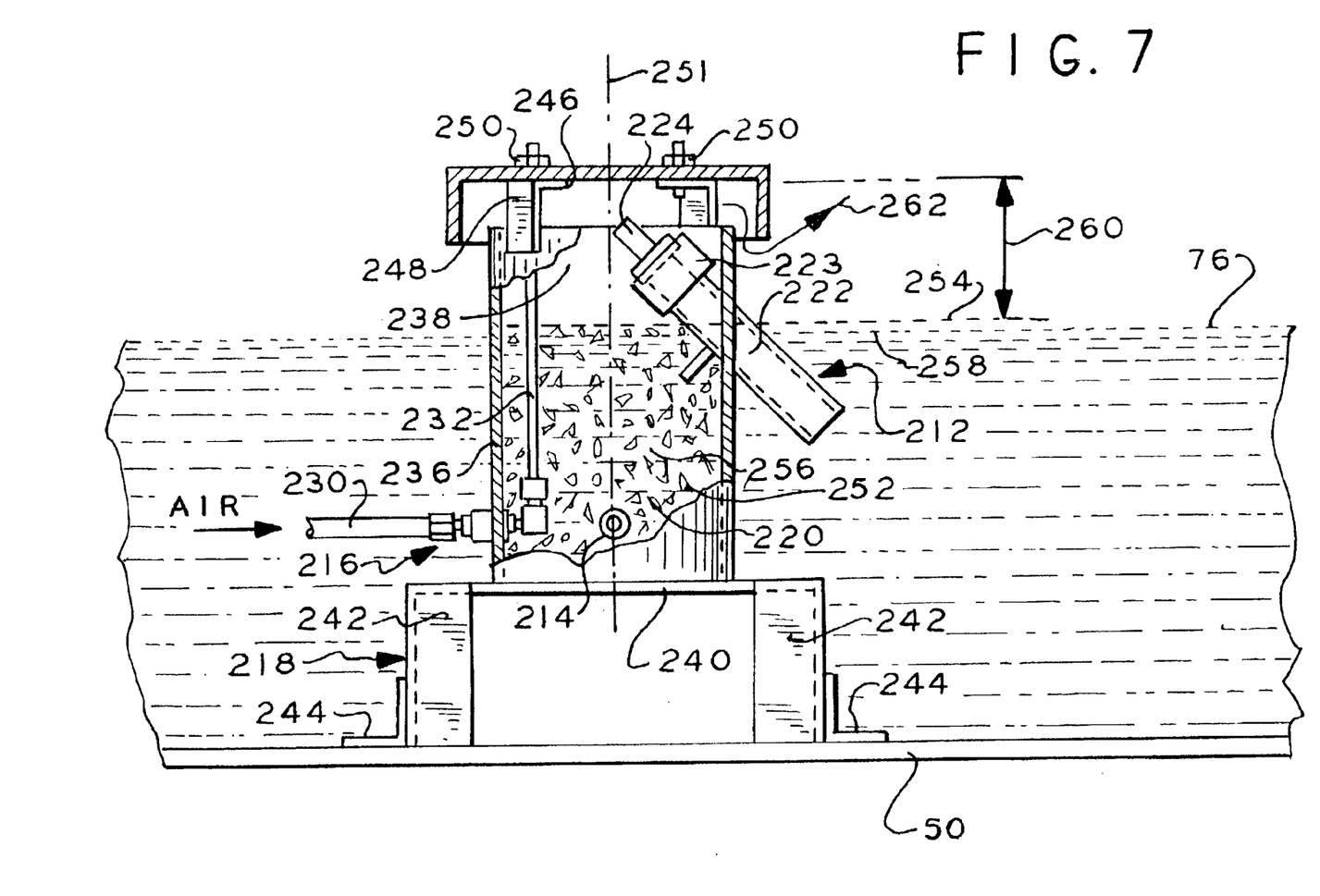
FIG. 7 is a sectional view of part of the liquid pilot assembly shown in FIG. 6.

Referring to FIGS. 6 and 7, a liquid pilot assembly generally indicated at 68 is provided. The assembly includes a spark plug igniter unit generally indicted at 212, a liquid fuel supply system 214, an air distribution system 216, a housing generally indicated at 218 and a vaporization system or subassembly 220. The spark plug igniter unit 212 has an inclined pipe 222, which is supported by the housing 218, a cap 223 which is supported by the inclined pipe 222 and a spark plug 224 which is supported by the cap 223. The spark plug is preferably of the turbine engine type which does not have a spark gap. The spark plug 224 has a control circuit or remote control unit so it can be controlled from any point.

The fuel system 214 has an inlet line 226 and a lower outlet nozzle or nozzle portion 228 which is supported by the housing 218. The air distribution system 216 has an inlet line 230, which is supported by the housing 218 and has a vertical tube 232. The vertical tube 232 has an upper outlet nozzle 234, which is arranged to cause a circular air flow or air swirl in the system. The housing 218 has a cylindrical or peripheral shell or wall or plate 236, which forms a chamber 238. The shell 236 has a floor plate 240 welded thereto. The plate 240 is supported by four framing or leg angles 242. The angles 242 are supported by two bearing angles 244 which have respective anchor bolt holes 245. The housing 218 also has a cover or hood 246, which is bolted to four angle pieces or clip angles 248, that are respectively welded to the shell 236. The clip angles 248 have respective bolts 250 for holding the hood 246. The shell 236 has an axis 251.

The vaporizer 220 can have a plurality of gravel stones 252, which are disposed in the chamber 238 to a fixed gravel level 254. The vaporizer 220 also has a volume of water 256 which is disposed between stones 252 in the chamber 238 to a variable water level 258. Water 256 may have a separate water supply line (not shown) and level control such as a float valve (not shown), as desired.

Liquid propane enters the chamber 238 from the nozzle 228 and is vaporized by the thermal exchange of the gravel and the water 256 to cause propane vapor above the water level 258.

The cylinder 236, and the gravel 252 at its level 254, and the hood 246 enclose a propane vapor ignition zone or space 260. The propane vapor in the zone 260 is swirled about axis 251 by air from the air nozzle 234. The swirling air and propane vapor mixture is then ignited by sparks from the spark plug 224, forming a flame (not shown). The flame exits through annular pathway 262. The assembly 210.

In operation, the liquid pilot assembly 210 acts as a self-igniting continuous pilot flame device. The assembly 210 is used to reliably ignite combustible fuel supplies. The assembly consists of an igniter unit 212 to electronically light a pilot flame, the vaporizer 220 and the fuel distribution line 214 to dispense the pilot fuel, and an air distribution line 216 to provide combustion air. The components are built as a modular assembly 210. The assembly 210 is positioned in the fuel spill pit 12 in a recess 264 in the reinforced deck 77. The assembly 210 is partially submerged in water, with only the upper surface of the assembly 210 exposed to view. The spark plug 224 creates a spark which directly ignites the pilot flame. An energy source (not shown) for the spark plug 224 is provided remotely by a separate module (not shown) and the spark itself is produced by the spark plug 224. Spark unit 212 has a turbine engine type spark plug. This type of spark plug has no gap between its electrodes, so there is virtually no chance that foreign materials will bridge an igniter gap and prevent operation. The spark plug 224 is positioned so water and extinguishing agents roll off the surface, thereby prolonging component life and improving reliability.

The fuel distribution system 214 consists of a tube 226 and nozzle 228 which dispense fuel beneath the surface 258 of the water. The air distribution system 216 includes a nozzle 234 mounted above the surface 258 of the water. The air system 216 is connected to a regulated remote air source which supplies a constant flow of clean, compressed air. This air improves the combustion process and prevents the local air/fuel mixture from becoming too rich.

The master processing unit 20 can be coupled to the local processing unit 28 at the facility by way of a bidirectional data, address and control bus 124. Alternatively, the master processing unit 20 can be coupled directly to related hardware for controlling fuel flow to the burner and igniter assemblies, the release of simulated smoke, and the like, as will be described in detail below. In a preferred aspect of the invention, the CPU 114 of the main processing unit 20 is coupled to the CPU 126 of the local processing unit 28. As is the case with the master processing unit 20, the local processing unit 28 includes a system RAM 132 and a ROM 134, along with suitable programing and hardware interfaces for communicating with and controlling various hardware interfaces. These devices include the fuel burner control valves 98 and smoke generator 104 that are associated with the firefighter training simulator of the subject invention, as well as any A/D converter apparatus that may be required for the processor to receive and interpret signal inputs received from analog sources. Preferably, outputs from the ignitor 68, UV sensor and temperature sensor 79 are in the form of digital data for direct transmission to the CPU 126.

The CPU 126 of the local processor unit is connected to the various sensor and hardware devices associated with each simulator training area such as compartment 12 illustrated in FIG. 2. Data from the UV sensor 93 relating to operation of the burner ignitor 68 is transmitted to the CPU 126 along a data line 140, whereas ignition signal input to the ignitor is transmitted along a communication line 142.

Fuel is conveyed under pressure from the tank 36 to the burner unit 38 upon receipt by the control valve system 98 of appropriate signal commands transmitted along the communication line 146. The valve control system includes a valve assembly, such as an appropriate motorized linear valve or ganging of solenoid valves that is mounted in an independently controllable manner within the fuel flow path to each of the respective burner assemblies 38. Upon receipt of appropriate signal input from the CPU 126, the valve control system 98 is operable to bias the motorized linear fuel control valves between a closed position and an open position so as to allow for precise metering of fuel under pressure from the tank 36 (through conduit 148) and into the burner fuel supply line 150 for delivery to the burner assembly 38. In instances where an array of solenoid valves are employed for fuel metering, the valves are selectively controlled to provide for the requisite level of fuel flow.

CPU 126 control of the smoke generator 104 is implemented along communication line 156. Upon receipt of an activation signal input from the CPU 126, smoke, which is preferably of the simulated, non-toxic variety such as that produced by the smoke generator disclosed in U.S. Pat. No. 5,367,603 issues Nov. 22, 1994 to Wenrich et al.

The CPU 126 can be operated in a manner well known to persons of ordinary skill in the art to control any of a variety of other simulator components, such as compartment ventilation, lighting, and other hardware. Signal data relating generally to the enablement, status and control of the foregoing hardware components discussed above is exchanged between the local and main processing systems along the data bus 124, thereby minimizing the complexity of communication and control exchanged between these two processing systems. The foregoing communication and control hierarchy is further advantageous in situations where the master processing unit 20, for any of a variety of reasons, is not located on-site at the burn area.

In a preferred aspect of the invention, the CPU 114 commands the CPU 126 to initiate a test of the fuel pressure and fuel control valves 98 in order to confirm their operability prior to the implementation of the training exercise This test is accomplished by CPU 114 accessing of appropriate program data stored in RAM 116, as described above, resulting in generation of an appropriate input signal to the CPU 126 of the local processing unit 28 on-site at the trainer compartment at which the firefighter training exercise is to be undertaken. The test is implemented upon accessing by the CPU 126 of test-related program data stored in RAM 132 in a manner known in the computer art, which effects signal output from the CPU 126 along communication line 146 to command the hardware at the burner control valve assembly 98 to undergo a prescribed regimen of openings, closings and system pressure checks. This pre-implementation test can further encompass test-firing of the burner ignitor 68 and the monitoring thereof by the UV sensor 93 associated with the ignitor by means of signals exchanged with the CPU 126 along the respective communication lines 142 and 140, as well as confirming operation of the blower 96 by monitoring at the CPU 126 blower status signal data that can be conveyed along the data line 143.

A training scenario can be commenced upon successful completion of the test regimen. The scenario can involve a single enhanced deck 50 in accordance with the foregoing description, or can alternatively include a plurality of such enhanced decks arranged into discrete, independently controllable zones to allow for simulation of spreading fires and the like. For each enhanced deck, fuel is supplied to the burner assembly 38 thereof in accordance with computer signal input to the control valve assembly 98. Appropriate signal input is also directed to the pilot assembly 68 that is associated with each burner assembly 38 to effect emission therefrom of pilot flames or sparks to ignite fuel vapor that passes from the burner elements to the surface of the liquid within the receptacle tub 52. Operation of the pilot assembly is confirmed by output signal data from the UV sensor 93, in the absence of which the CPU 126 is operable to terminate fuel delivery to the burner assembly 38 by closing the fuel control valve assembly 98.

The temperature of support surface 76 is controlled by keeping the decking submerged in water. Water is delivered to the receptacle at a rate which effects cooling of the walk surface 76 to the desired temperature. The depth of water can be maintained by a simple float valve which floats on the surface of the water and opens the flow of water from the supply line when it moves downward caused by the reduction in the level of the water. In this manner, the decking can be kept covered with water at all times.

As has been mentioned previously, conventional metal grating support surfaces can attain temperatures in excess of 850° F., and even attain 1,000° F. or more, in the absence of cooling fluid during the course of a training scenario. Temperatures of this magnitude pose a serious, and potentially life-threatening, danger to firefighter personnel, as most SCBA gear is rated for temperatures of only up to about 475° F. Accordingly, it is highly desirable to minimize these temperatures, and the present invention and various modifications and adaptations thereof that are possible from the foregoing disclosure and to which the accompanying claims are directed, overcomes this problem.

The above description describes the configuration of one embodiment of the device of the invention. Any decking system can be utilized that promotes dispersion of the propane. The decking selected should also transfer loads directly to the concrete base of the pit.

Although the description of the invention deals with one digital computer control system, it should be understood that alternate types of automatic control systems can be utilized and the control system can also be manually operated and no feedback from the trainer is required.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. In a system for use in a firefighter trainer for simulating a ground fuel or chemical spill, comprising a container for liquid in the form of an open pit, a source of fuel providing a fuel for delivery on a surface of liquid in the pit, and an ignition means for igniting the fuel on the surface of the liquid to produce a flame simulating the ground fuel or chemical spill, and a decking disposed inside the pit, the improvement which comprises providing a decking having S-shaped vertical reticular bars with a top surface and a bottom surface, the top surface of the decking disposed at ground level to form a support surface to allow driving of a vehicle onto the decking, the decking being supported on vertical bearing bars creating vertical passageways and a channel space between a bottom of the pit and the bottom surface of the reticular bars, a dispersing means for dispersing the fuel into the liquid within the channel space and the vertical passageways through the decking to allow the flow of the fuel to the surface of the liquid.

2. The system according to claim 1, further comprising a system for sensing the temperature of the decking.

3. The system according to claim 2, wherein said temperature sensing system comprises a thermocouple that is coupled to said decking.

4. The system according to claim 1, further comprising a liquid replenishment system connected to said pit and operable to supply additional liquid to the pit.

5. The system according to claim 4, further comprising a system for controlling liquid flow into said pit to maintain a temperature of the support surface at or below a predetermined temperature.

6. The system according to claim 1, further comprising a system for separating an extinguishing agent applied by a system user from the liquid.

7. The system according to claim 1, wherein said ignition means comprises an ignitor assembly that is operable to generate a spark or flame for delivery through the pit to the support surface of the decking.

8. The system according to claim 7, wherein a conduit is provided for delivering said spark or flame to said support surface.

9. The system according to claim 7, wherein said ignition means further comprises a source of positive pressure that is operable to bias said spark or flame toward said support surface.

10. The system according to claim 1, further comprising a source of a visual obscuration medium.

11. The system according to claim 10, wherein a conduit is provided for delivering said visual obscuration medium to the support surface through the pit.

12. The system according to claim 1, wherein the fuel is propane gas.

13. The system according to claim 1, wherein the fuel is liquid propane.

14. The system according to claim 1, wherein the S-shaped vertical reticular bars are approximately $3/16$ inches thick and approximately 1.5 inches high.

15. The system according to claim 1, wherein the vertical bearing bars are $3/8$ inches thick, approximately 2.5 inches high and including approximately 2.6875 inches spacing between the bearing bars center to center.

16. The system according to claim 1, wherein the S-shaped vertical reticular bars are preferably $3/16$ inches thick and 1.5 inches in height, the vertical bearing bars are $3/8$ inches thick, approximately 2.5 inches high and including a spacing of about 2.6875 inches between the bearing bars center to center.

17. The system according to claim 1, wherein the pit is formed of concrete.

18. The system according to claim 1, wherein the pit includes a depth of approximately 3 inches below ground level.

19. The system according to claim 1, wherein the vertical passageways are spaced approximately 15 inches apart.

20. The system according to claim 1, wherein the S-shaped vertical reticular bars are preferably $3/16$ inches thick and 1.5 inches in height, the vertical bearing bars are $3/8$ inches thick, approximately 2.5 inches high with spacing of about 2.6875 inches between the bearing bars center to center, and said channel space being a 1.0 inch raised channel space disposed below the bottom surface of the reticular bars between the bearing bars.

21. Firefighting training equipment for use in a ground pit for holding liquid and simulating a fire on the ground, comprising a decking in the pit at or near the surface of the liquid for supporting a vehicle, the decking having vertical reticular bars with a top surface and a bottom surface, the top surface of the decking disposed at ground level to allow driving of the vehicle onto the decking, the decking being supported on vertical bearing bars creating vertical passageways and a channel space between a bottom of the pit and the bottom surface of the reticular bars, means for dispersing fuel into the liquid within the channel space and the vertical passageways and through the decking to allow the flow of the fuel to the surface of the liquid, and ignition means for igniting the fuel.

22. The equipment of claim 21, wherein the pit is a tank disposed to hold said liquid, said tank having a bottom and a side wall; means within said tank for releasing into said liquid and beneath the surface of said liquid a pressurized fuel in the form of a plurality of separate, spaced-apart streams of fuel.

23. The equipment of claim 22, wherein said tank is equipped with an overflow drain for draining off excess liquid and an excess applied flowable firefighting material to maintain a substantially constant level in said tank.

24. The equipment of claim 23, wherein said drain comprises at least, an upright drain pipe, and further comprising an igniter that is disposed to provide from said drain pipe an upwardly directed ignition flame for igniting said fuel.

25. The equipment of claim 21, further comprising an igniter that is disposed centrally of said pit and to provide an upwardly directed ignition spark or flame for igniting the fuel at the surface of the liquid.

26. The equipment of claim 25, further comprising means for sensing the temperature of the decking and the liquid and a monitoring means to deliver said liquid to said pit to maintain the temperature of the decking.

27. The equipment of claim 26, wherein said monitoring means comprises an overflow drain for drawing off excess liquid and an excess applied flowable firefighting material, to maintain a substantially constant level in said pit.

28. The equipment of claim 27, further comprising a source of a visual obscuration medium, said obscuration medium being delivered through a conduit to said pit and through said pit to a position adjacent to the surface of the liquid.

29. A process for creating a firefighter trainer for simulating a ground fuel or chemical spill, the process comprising providing a open pit structure containing liquid, a source of combustible fuel providing a fuel for delivery on a surface of the liquid in the pit, an ignition means for igniting the fuel on the surface of the liquid to produce a flame simulating the ground fuel or chemical spill, a reinforced deck inside the pit, the improvement which comprises providing a reinforced decking at or near the surface of the liquid for supporting a vehicle, the decking having S-shaped vertical reticular bars with a top surface and a bottom surface, the top surface of the decking at ground level to allow driving of the vehicle onto the decking, the decking being supported on vertical bearing bars creating vertical passageways and a channel space between a bottom of the pit and the bottom surface of the reticular bars, a dispersing means for dispersing the fuel into the liquid within the channel space and the vertical passageways and through the decking to allow the flow of the fuel to the surface of the liquid.

30. The process of claim 29, wherein the liquid is water.

31. The process of claim 29, further comprising the step of introducing a visual obscuration medium to the ground fuel or chemical spill.

* * * * *